United States Patent
Fukaumi et al.

(10) Patent No.: US 10,227,505 B2
(45) Date of Patent: Mar. 12, 2019

(54) ACTIVE ENERGY RAY-CURABLE COMPOSITION

(71) Applicant: Kaneka Corporation, Osaka (JP)

(72) Inventors: Hiroki Fukaumi, Hyogo (JP); Youichi Matsuo, Hyogo (JP); Atsushi Tsukao, Hyogo (JP); Shinji Kagitani, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 393 days.

(21) Appl. No.: 14/899,826

(22) PCT Filed: Jun. 23, 2014

(86) PCT No.: PCT/JP2014/066548
§ 371 (c)(1),
(2) Date: Dec. 18, 2015

(87) PCT Pub. No.: WO2014/204010
PCT Pub. Date: Dec. 24, 2014

(65) Prior Publication Data
US 2016/0145467 A1 May 26, 2016

(30) Foreign Application Priority Data
Jun. 21, 2013 (JP) .................. 2013-130967

(51) Int. Cl.
*C09D 183/06* (2006.01)
*C08G 59/20* (2006.01)
*C08G 77/14* (2006.01)
*B32B 27/06* (2006.01)

(52) U.S. Cl.
CPC ............ *C09D 183/06* (2013.01); *B32B 27/06* (2013.01); *C08G 59/20* (2013.01); *C08G 77/14* (2013.01); *B32B 2307/558* (2013.01); *B32B 2605/00* (2013.01)

(58) Field of Classification Search
CPC .................................................. C09D 183/06
See application file for complete search history.

(56) References Cited

U.S. PATENT DOCUMENTS

| | | | |
|---|---|---|---|
| 5,260,361 A | 11/1993 | Fukushima et al. | |
| 5,457,003 A * | 10/1995 | Tanaka | G03F 7/0757 430/169 |
| 7,049,044 B2 * | 5/2006 | Gonsalves | C08G 77/442 430/270.1 |
| 2006/0009547 A1 | 1/2006 | Maeshima et al. | |
| 2007/0071684 A1 * | 3/2007 | Crutchley | C08F 290/067 424/9.52 |

FOREIGN PATENT DOCUMENTS

| | | |
|---|---|---|
| CN | 1688561 A | 10/2005 |
| CN | 102066464 A | 5/2011 |
| CN | 102597116 A | 7/2012 |
| JP | H05-230397 A | 9/1993 |
| JP | 2000-109695 A | 4/2000 |
| JP | 2004-204228 A | 7/2004 |
| JP | 2005-15581 A | 1/2005 |
| JP | 2008-285502 A | 11/2008 |
| JP | 2011-518666 A | 6/2011 |
| JP | 2011-184700 A | 9/2011 |
| JP | 2012-533675 A | 12/2012 |
| WO | 2009/131680 A1 | 10/2009 |
| WO | 2011/011167 A2 | 1/2011 |

OTHER PUBLICATIONS

First Office Action dated Sep. 28, 2016 by The State Intellectual Property Office of The Peoples Republic of China in related Chinese Patent Application No. CN-201480035324.7, with English translation (14 pages).
International Search Report issued in corresponding application No. PCT/JP2014/066548 dated Jul. 22, 2014 (4 pages).
English translation of International Preliminary Report issued in corresponding application No. PCT/JP2014/066548 dated Dec. 22, 2015 (6 pages).
Office Action issued in Japanese Application No. 2015-522995, dated Jun. 19, 2018 (17 pages).

\* cited by examiner

*Primary Examiner* — Kuo Liang Peng
(74) *Attorney, Agent, or Firm* — Osha Liang LLP

(57) ABSTRACT

An active energy ray-curable composition includes (A) a condensate having a weight average molecular weight of 20,000 or less, and (B) a photoacid generator, with the condensate (A) being obtained by hydrolysis/condensation of: (I) a silane compound containing a hydrolyzable silyl group represented by formula (I): $R^1-(SiR^2_a(OR^3)_{3-a})$. A ratio (Y/X) of Y to X is 0.2 or less, where X represents the number of moles of $OR^3$ groups directly bonded to silicon atoms in the silane compound (I) which is a starting material of the condensate (A) and Y represents the number of moles of $OR^3$ groups directly bonded to silicon atoms in the condensate (A).

19 Claims, No Drawings

ACTIVE ENERGY RAY-CURABLE COMPOSITION

TECHNICAL FIELD

The present invention relates generally to an active energy ray-curable composition, a cured product, a laminate, and a method for producing a laminate.

BACKGROUND ART

Photocurable resin coating agents have been extensively studied recently in the field of hard coatings to provide a lighter and less expensive alternative to metals and glass. In particular, many coating agents that are UV-curable with a photoradical generator have been reported (Patent Literature 1). Unfortunately, however, curing methods using radicals tend to allow curing to be inhibited by oxygen, so that curing tends to be insufficient around the interface between the coating agent and air.

Coating agents that mainly include a compound containing a cationic curable functional group such as a hydrolyzable silyl group or epoxy group and are curable with a photoacid generator have also been reported (Patent Literatures 2 and 3). When curable compositions mainly including a compound containing a cationic curable functional group such as a hydrolyzable silyl group or epoxy group are photocured, curing is not inhibited by oxygen in the air and the entire coating is instantly cured, achieving sufficient hardness and sufficient scratch resistance.

In particular, a siloxane bond, which is formed by cationic curing of a hydrolyzable silyl group, has drawn attention because it tends to provide high hardness and high scratch resistance. However, when a hydrolyzable silyl group is used for curing, hydrolysis/condensation polymerization is accompanied by shrinkage on curing, causing cracks and warpage. In this context, various attempts have been made in which a hydrolyzable silyl group of a silane compound containing an epoxy group, vinyl group or the like is hydrolyzed/condensation polymerized with an acid catalyst such as hydrochloric acid, acetic acid, or formic acid in advance, and the silane compound is photocured via the epoxy group, vinyl group or the like. An epoxy group is particularly often used to suppress shrinkage on curing after photocuring. However, the hydrolyzable epoxy group is hydrolyzed in the presence of the acid catalyst described above and the resulting coating unfortunately fails to have sufficient physical properties. In view of application to the entire panel of devices such as smartphones or tablets, the coating needs to be excellent in hardness and scratch resistance and it is necessary to allow as many epoxy groups as possible to remain so as to achieve high crosslink density.

In addition, laminates having a layer formed from a polyfunctionalacrylate curable composition exhibit warpage when left under high temperature and high humid conditions.

CITATION LIST

Patent Literature

Patent Literature 1: JP-A H05-230397
Patent Literature 2: JP-A 2000-109695
Patent Literature 3: JP-A 2004-204228

SUMMARY OF INVENTION

One or more embodiments of the present invention provide a curable composition which is excellent in hardness, scratch resistance, and impact resistance and is free from crack formation caused by shrinkage on curing.

In one aspect, embodiments of the present invention relate to an active energy ray-curable composition, containing (A) a condensate having a weight average molecular weight of 20,000 or less and (B) a photoacid generator, the condensate (A) being obtained by hydrolysis/condensation of:

(I) a silane compound containing a hydrolyzable silyl group represented by the following formula (I):

$$R^1-(SiR^2{}_a(OR^3)_{3-a}) \tag{I}$$

wherein $R^1$ is a C1-10 alkyl group terminally substituted by a 3,4-epoxycyclohexyl group; each $R^2$ is independently a hydrogen atom or a monovalent hydrocarbon group selected from a C1-10 alkyl group, a C6-25 aryl group, and a C7-12 aralkyl group; each $R^3$ is independently a hydrogen atom or a C1-10 alkyl group; and a is an integer of 0 to 2; and (II) a silane compound containing a hydrolyzable silyl group represented by the following formula (II):

$$R^4-Si(OR^3)_3 \tag{II}$$

wherein $R^4$ is a group selected from a C1-10 substituted or unsubstituted alkyl group, an alkenyl group, and a substituted aryl group and free of a 3,4-epoxycyclohexyl group; and each $R^3$ is independently a hydrogen atom or a C1-10 alkyl group, at a molar ratio of the silane compound (II) to the silane compound (I) of 0 to 2.0 under basic conditions, wherein a ratio (Y/X) of Y to X is 0.2 or less, where X represents the number of moles of $OR^3$ groups directly bonded to silicon atoms in the silane compound (I) and the silane compound (II) which are starting materials of the condensate (A) and Y represents the number of moles of $OR^3$ groups directly bonded to silicon atoms in the condensate (A).

For example, $R^1$ is a β-(3,4-epoxycyclohexyl)ethyl group.

For example, the condensate (A) is obtained by hydrolysis/condensation using as the silane compound (II)

(II-1) a silane compound containing a hydrolyzable silyl group represented by the following formula (II-1):

$$R^5-Si(OR^3)_3 \tag{II-1}$$

wherein $R^5$ is a group selected from a C1-10 alkyl group substituted by a (meth)acryloyl, glycidyl, or thiol group, a C2-10 alkenyl group, and a substituted aryl group, and free of a 3,4-epoxycyclohexyl group; and each $R^3$ is independently a hydrogen atom or a C1-10 alkyl group, and (II-2) a silane compound containing a hydrolyzable silyl group represented by the following formula (II-2):

$$R^6-Si(OR^3)_3 \tag{II-2}$$

wherein $R^6$ is a group selected from a C1-10 alkyl group substituted by an amino, phenyl, cyclohexyl, or chloro group, and a C1-10 unsubstituted alkyl group, and free of a 3,4-epoxycyclohexyl group; and each $R^3$ is independently a hydrogen atom or a C1-10 alkyl group, at a molar ratio of the silane compound (II-1) to the silane compound (I) of 0.03 to 1.0 and a molar ratio of the silane compound (II-2) to the silane compound (I) of 0 to 1.0.

For example, the active energy ray-curable composition further contains (D) an alicyclic epoxy compound.

For example, the alicyclic epoxy compound (D) is 3,4-epoxycyclohexylmethyl-3',4'-epoxycyclohexane carboxylate.

For example, the active energy ray-curable composition further contains (E) metal oxide fine particles having an average particle size of 100 nm or less.

For example, the metal oxide fine particles (E) are silica fine particles.

For example, the active energy ray-curable composition contains, relative to 100 parts by weight of the condensate (A), 0.05 to 30 parts by weight of the photoacid generator (B), 0 to 100 parts by weight of the alicyclic epoxy compound (D), and 0 to 100 parts by weight of the metal oxide fine particles (E).

For example, the photoacid generator (B) is an aromatic sulfonium salt or an aromatic iodonium salt.

For example, the photoacid generator (B) contains a fluorophosphate anion or a fluoroantimonate anion as a counter anion.

For example, the active energy ray-curable composition further contains (F) a photosensitizer.

For example, the photosensitizer (F) is an anthracene derivative, a thioxanthone derivative, or a benzophenone derivative.

In another aspect, one or more embodiments of the present invention also relate to a cured product, obtained by curing the active energy ray-curable composition according to one or more embodiments of the present invention.

In another aspect, one or more embodiments of the present invention also relate to a method for producing a laminate, including the steps of: applying the active energy ray-curable composition according to one or more embodiments of the present invention to a substrate; and curing the active energy ray-curable composition by irradiation with active energy rays to form a cured coating.

In another aspect, one or more embodiments of the present invention also relates to a laminate, obtained by the above production method.

For example, the laminate is produced using the active energy ray-curable composition and a single layer substrate, the active energy ray-curable composition containing the condensate (A) obtained by hydrolysis/condensation using as the silane compound (II)

(II-1) a silane compound containing a hydrolyzable silyl group represented by the following formula (II-1):

$$R^5—Si(OR^3)_3 \quad (II-1)$$

wherein $R^5$ is a group selected from a C1-10 alkyl group substituted by a (meth)acryloyl, glycidyl, or thiol group, a C2-10 alkenyl group, and a substituted aryl group, and free of a 3,4-epoxycyclohexyl group; and each $R^3$ is independently a hydrogen atom or a C1-10 alkyl group, and (II-2) a silane compound containing a hydrolyzable silyl group represented by the following formula (II-2):

$$R^6—Si(OR^3)_3 \quad (II-2)$$

wherein $R^6$ is a group selected from a C1-10 alkyl group substituted by an amino, phenyl, cyclohexyl, or chloro group, and a C1-10 unsubstituted alkyl group, and free of a 3,4-epoxycyclohexyl group; and each $R^3$ is independently a hydrogen atom or a C1-10 alkyl group, at a molar ratio of the silane compound (II-1) to the silane compound (I) of 0.03 to 1.0 and a molar ratio of the silane compound (II-2) to the silane compound (I) of 0 to 1.0.

Advantageous Effects of Invention

One or more embodiments of the present invention provide a curable composition which is excellent in hardness, scratch resistance, and impact resistance and is free from crack formation caused by shrinkage on curing.

DESCRIPTION OF EMBODIMENTS

Embodiments of the present invention are described in detail below.

The active energy ray-curable composition according to one or more embodiments of the present invention contains a condensate (A) having a weight average molecular weight of 20,000 or less and a photoacid generator (B), the condensate (A) being obtained by hydrolysis/condensation of a silane compound (I) containing a hydrolyzable silyl group and a silane compound (II) containing a hydrolyzable silyl group at a molar ratio of the silane compound (II) to the silane compound (I) of 0 to 2.0 under basic conditions, wherein a ratio (Y/X) of Y to X is 0.2 or less, where X represents the number of moles of $OR^3$ groups directly bonded to silicon atoms in the silane compound (I) and the silane compound (II) which are starting materials of the condensate (A) and Y represents the number of moles of $OR^3$ groups directly bonded to silicon atoms in the condensate (A).

<(A) Condensate>

The silane compound (I) containing a hydrolyzable silyl group is represented by the following formula (I):

$$R^1—(SiR^2_a(OR^3)_{3-a}) \quad (I)$$

wherein $R^1$ is a C1-10 alkyl group terminally substituted by a 3,4-epoxycyclohexyl group; each $R^2$ is independently a hydrogen atom or a monovalent hydrocarbon group selected from a C1-10 alkyl group, a C6-25 aryl group, and a C7-12 aralkyl group; each $R^3$ is independently a hydrogen atom or a C1-10 alkyl group; and a is an integer of 0 to 2.

The silane compound (II) containing a hydrolyzable silyl group is represented by the following formula (II):

$$R^4—Si(OR^3)_3 \quad (II)$$

wherein $R^4$ is a group selected from a C1-10 substituted or unsubstituted alkyl group, an alkenyl group, and a substituted aryl group, and free of a 3,4-epoxycyclohexyl group; and each $R^3$ is independently a hydrogen atom or a C1-10 alkyl group.

$R^1$ in the formula (I) is a C1-10 alkyl group terminally substituted by a 3,4-epoxycyclohexyl group. Examples include a (3,4-epoxycyclohexyl)methyl group, a (3,4-epoxycyclohexyl)ethyl group, a (3,4-epoxycyclohexyl)propyl group, a (3,4-epoxycyclohexyl)butyl group, a (3,4-epoxycyclohexyl)pentyl group, and a (3,4-epoxycyclohexyl)hexyl group.

$R^2$ in the formula (I) is a hydrogen atom or a monovalent hydrocarbon group selected from a C1-10 alkyl group, a C6-25 aryl group, and a C7-12 aralkyl group. Examples of such hydrocarbon groups include methyl, ethyl, propyl, butyl, pentyl, hexyl, octyl, nonyl, decyl, phenyl, tolyl, xylyl, naphthyl, benzyl, and phenethyl groups.

Each $R^3$ in the formulae (I) and (II) is a hydrogen atom or a C1-10 alkyl group. Examples of alkyl groups include methyl, ethyl, propyl, butyl, pentyl, hexyl, octyl, nonyl, and decyl groups. The carbon number of the alkyl group for $R^3$ is preferably 1 to 3, most preferably 1, to allow the silane compound containing a hydrolyzable silyl group to easily undergo hydrolysis/condensation.

$R^4$ in the formula (II) is a group selected from a C1-10 substituted or unsubstituted alkyl group, an alkenyl group, and a substituted aryl group, and free of a 3,4-epoxycyclohexyl group. Examples of alkyl groups include methyl, ethyl, propyl, butyl, pentyl, hexyl, octyl, nonyl, and decyl groups. Examples of substituents on the alkyl group include glycidyl, thiol, amino, (meth)acryloyl, phenyl, cyclohexyl, and chloro groups. Examples of alkenyl groups include vinyl, allyl, 3-butenyl, 4-pentenyl, 5-hexenyl, 6-heptenyl, and 7-octenyl groups. Examples of substituted aryl groups include a styryl group.

In particular, when $R^4$ is an unsubstituted alkyl group, it is preferably a C3-10 alkyl group, more preferably a C3-6 alkyl group, to provide good storage stability and a high curing rate during irradiation with active energy rays and also to suppress crack formation in the resulting coating. When $R^4$ is a substituted alkyl group, it is preferably a C3-10 alkyl group, more preferably a C3-6 alkyl group, and preferred substituents are phenyl, cyclohexyl, and (meth) acryloyl groups. When $R^4$ is an alkenyl group, it is preferably a vinyl group or an allyl group. The substituted aryl group is preferably a styryl group. When $R^4$ is an unsubstituted alkyl group having a carbon number of 2 or less, or a substituted alkyl group whose substituent is less bulky than a phenyl, cyclohexyl, or (meth)acryloyl group, a densely crosslinked structure may be formed during crosslinking, causing gelation. When $R^4$ is an alkyl group having a carbon number of 11 or more, or a substituted alkyl group whose substituent is more bulky than a phenyl, cyclohexyl, or (meth)acryloyl group, hydrophobicity may increase, causing an extreme decrease in the rate of hydrolysis, and curing rate during irradiation with active energy rays may decrease.

In the formula (I), the symbol "a" is an integer of 0 to 2, which is selected as appropriate according to the physical properties required of the curable composition.

Examples of the silane compound (I) include α-(3,4-epoxycyclohexyl)methylsilanes such as α-(3,4-epoxycyclohexyl)methyltrimethoxysilane, α-(3,4-epoxycyclohexyl)methylmethyldimethoxysilane, α-(3,4-epoxycyclohexyl)methyldimethylmethoxysilane, α-(3,4-epoxycyclohexyl)methyltriethoxysilane, α-(3,4-epoxycyclohexyl)methylmethyldiethoxysilane, α-(3,4-epoxycyclohexyl)methyldimethylethoxysilane, α-(3,4-epoxycyclohexyl)methyltripropoxysilane, α-(3,4-epoxycyclohexyl)methylmethyldipropoxysilane, and α-(3,4-epoxycyclohexyl)methyldimethylpropoxysilane; β-(3,4-epoxycyclohexyl)ethylsilanes such as β-(3,4-epoxycyclohexyl)ethyltrimethoxysilane, β-(3,4-epoxycyclohexyl)ethylmethyldimethoxysilane, β-(3,4-epoxycyclohexyl)ethyldimethylmethoxysilane, β-(3,4-epoxycyclohexyl)ethyltriethoxysilane, β-(3,4-epoxycyclohexyl)ethylmethyldiethoxysilane, β-(3,4-epoxycyclohexyl)ethyldimethylethoxysilane, β-(3,4-epoxycyclohexyl)ethyltripropoxysilane, β-(3,4-epoxycyclohexyl)ethylmethyldipropoxysilane, and β-(3,4-epoxycyclohexyl)ethyldimethylpropoxysilane; γ-(3,4-epoxycyclohexyl)propylsilanes such as γ-(3,4-epoxycyclohexyl)propyltrimethoxysilane, γ-(3,4-epoxycyclohexyl)propylmethyldimethoxysilane, γ-(3,4-epoxycyclohexyl)propyldimethylmethoxysilane, γ-(3,4-epoxycyclohexyl)propyltriethoxysilane, γ-(3,4-epoxycyclohexyl)propylmethyldiethoxysilane, γ-(3,4-epoxycyclohexyl)propyldimethylethoxysilane, γ-(3,4-epoxycyclohexyl)propyltripropoxysilane, γ-(3,4-epoxycyclohexyl)propylmethyldipropoxysilane, and γ-(3,4-epoxycyclohexyl)propyldimethylpropoxysilane; δ-(3,4-epoxycyclohexyl)butylsilanes such as δ-(3,4-epoxycyclohexyl)butyltrimethoxysilane, δ-(3,4-epoxycyclohexyl)butylmethyldimethoxysilane, δ-(3,4-epoxycyclohexyl)butyldimethylmethoxysilane, δ-(3,4-epoxycyclohexyl)butyltriethoxysilane, δ-(3,4-epoxycyclohexyl)butylmethyldiethoxysilane, δ-(3,4-epoxycyclohexyl)butyldimethylethoxysilane, δ-(3,4-epoxycyclohexyl)butyltripropoxysilane, δ-(3,4-epoxycyclohexyl)butylmethyldipropoxysilane, and δ-(3,4-epoxycyclohexyl)butyldimethylpropoxysilane; ε-(3,4-epoxycyclohexyl)pentylsilanes such as ε-(3,4-epoxycyclohexyl)pentyltrimethoxysilane, ε-(3,4-epoxycyclohexyl)pentylmethyldimethoxysilane, ε-(3,4-epoxycyclohexyl)pentyldimethylmethoxysilane, ε-(3,4-epoxycyclohexyl)pentyltriethoxysilane, ε-(3,4-epoxycyclohexyl)pentylmethyldiethoxysilane, ε-(3,4-epoxycyclohexyl)pentyldimethylethoxysilane, ε-(3,4-epoxycyclohexyl)pentyltripropoxysilane, ε-(3,4-epoxycyclohexyl)pentylmethyldipropoxysilane, and ε-(3,4-epoxycyclohexyl)pentyldimethylpropoxysilane; ζ-(3,4-epoxycyclohexyl)hexylsilanes such as ζ-(3,4-epoxycyclohexyl)hexyltrimethoxysilane, ζ-(3,4-epoxycyclohexyl)hexylmethyldimethoxysilane, ζ-(3,4-epoxycyclohexyl)hexyldimethylmethoxysilane, ζ-(3,4-epoxycyclohexyl)hexyltriethoxysilane, ζ-(3,4-epoxycyclohexyl)hexylmethyldiethoxysilane, ζ-(3,4-epoxycyclohexyl)hexyldimethylethoxysilane, ζ-(3,4-epoxycyclohexyl)hexyltripropoxysilane, ζ-(3,4-epoxycyclohexyl)hexylmethyldipropoxysilane, and ζ-(3,4-epoxycyclohexyl)hexyldimethylpropoxysilane; η-(3,4-epoxycyclohexyl)heptylsilanes such as η-(3,4-epoxycyclohexyl)heptyltrimethoxysilane, η-(3,4-epoxycyclohexyl)heptylmethyldimethoxysilane, η-(3,4-epoxycyclohexyl)heptyldimethylmethoxysilane, η-(3,4-epoxycyclohexyl)heptyltriethoxysilane, η-(3,4-epoxycyclohexyl)heptylmethyldiethoxysilane, η-(3,4-epoxycyclohexyl)heptyldimethylethoxysilane, η-(3,4-epoxycyclohexyl)heptyltripropoxysilane, η-(3,4-epoxycyclohexyl)heptylmethyldipropoxysilane, and η-(3,4-epoxycyclohexyl)heptyldimethylpropoxysilane; and θ-(3,4-epoxycyclohexyl)octylsilanes such as θ-(3,4-epoxycyclohexyl)octyltrimethoxysilane, θ-(3,4-epoxycyclohexyl)octylmethyldimethoxysilane, θ-(3,4-epoxycyclohexyl)octyldimethylmethoxysilane, θ-(3,4-epoxycyclohexyl)octyltriethoxysilane, θ-(3,4-epoxycyclohexyl)octylmethyldiethoxysilane, θ-(3,4-epoxycyclohexyl)octyldimethylethoxysilane, θ-(3,4-epoxycyclohexyl)octyltripropoxysilane, θ-(3,4-epoxycyclohexyl)octylmethyldipropoxysilane, and θ-(3,4-epoxycyclohexyl)octyldimethylpropoxysilane.

As described above, the carbon number of the alkyl group for $R^3$ in the formula (I) is preferably 1 to 3, most preferably 1, to allow the silane compound containing a hydrolyzable silyl group to easily undergo hydrolysis/condensation. In view of reactivity of the epoxycyclohexyl group during irradiation with active energy rays, the carbon number of the alkylene group linking the epoxycyclohexyl group to the silicon atom is important and is preferably 1 to 4, more preferably 2 or 3. From a combination of the above viewpoints, preferred examples of the silane compound (I) are β-(3,4-epoxycyclohexyl)ethyltrimethoxysilane, β-(3,4-epoxycyclohexyl)ethylmethyldimethoxysilane, β-(3,4-epoxycyclohexyl)ethyldimethylmethoxysilane, γ-(3,4-epoxycyclohexyl)propyltrimethoxysilane, γ-(3,4-epoxycyclohexyl)propylmethyldimethoxysilane, and γ-(3,4-epoxycyclohexyl)propyldimethylmethoxysilane. Among these, compounds in which $R^1$ is a β-(3,4-epoxycyclohexyl)ethyl group are preferred.

Examples of the silane compound (II) in which $R^4$ in the formula (II) is an unsubstituted alkyl group include methyltrimethoxysilane, methyltriethoxysilane, methyltripropoxysilane, ethyltrimethoxysilane, ethyltriethoxysilane, ethyltripropoxysilane, propyltrimethoxysilane, propyltriethoxysilane, propyltripropoxysilane, butyltrimethoxysilane, butyltriethoxysilane, butyltripropoxysilane, pentyltrimethoxysilane, pentyltriethoxysilane, pentyltripropoxysilane, hexyltrimethoxysilane, hexyltriethoxysilane, hexyltripropoxysilane, heptyltrimethoxysilane, heptyltriethoxysilane, heptyltripropoxysilane, octyltrimethoxysilane, octyltriethoxysilane, octyltripropoxysilane, nonyltrimethoxysilane, nonyltriethoxysilane, nonyltripropoxysilane, decyltrimethoxysilane, decyltriethoxysilane, and decyltripropoxysilane.

Examples of those in which $R^4$ in the formula (II) is a substituted alkyl group include those listed below. Any substituent may be used, but glycidyl, thiol, amino, (meth)acryloyl, phenyl, cyclohexyl, and chloro groups are preferred in view of easy availability.

Examples of compounds in which $R^4$ is a glycidyl-substituted alkyl group include glycidoxymethyltrimethoxysilane, glycidoxymethyltriethoxysilane, 2-glycidoxyethyltrimethoxysilane, 2-glycidoxyethyltriethoxysilane, 3-glycidoxypropyltrimethoxysilane, 3-glycidoxypropyltriethoxysilane, 4-glycidoxybutyltrimethoxysilane, 4-glycidoxybutyltriethoxysilane, 5-glycidoxypentyltrimethoxysilane, 5-glycidoxypentyltriethoxysilane, 6-glycidoxyhexyltrimethoxysilane, and 6-glycidoxyhexyltriethoxysilane.

Examples of compounds in which $R^4$ is a thiol-substituted alkyl group include mercaptomethyltrimethoxysilane, mercaptomethyltriethoxysilane, 2-mercaptoethyltrimethoxysilane, 2-mercaptoethyltriethoxysilane, 3-mercaptopropyltrimethoxysilane, 3-mercaptopropyltriethoxysilane, 4-mercaptobutyltrimethoxysilane, 4-mercaptobutyltriethoxysilane, 5-mercaptopentyltrimethoxysilane, 5-mercaptopentyltriethoxysilane, 6-mercaptohexyltrimethoxysilane, and 6-mercaptohexyltriethoxysilane.

Examples of compounds in which $R^4$ is an amino-substituted alkyl group include N-2-(aminoethyl)aminomethyltrimethoxysilane, N-2-(aminoethyl)aminomethyltriethoxysilane, N-2-(aminoethyl)-2-aminoethyltrimethoxysilane, N-2-(aminoethyl)-2-aminoethyltriethoxysilane, N-2-(aminoethyl)-3-aminopropyltrimethoxysilane, N-2-(aminoethyl)-3-aminopropyltriethoxysilane, N-2-(aminoethyl)-4-aminobutyltrimethoxysilane, N-2-(aminoethyl)-4-aminobutyltriethoxysilane, N-2-(aminoethyl)-5-aminopentyltrimethoxysilane, N-2-(aminoethyl)-5-aminopentyltriethoxysilane, N-2-(aminoethyl)-6-aminohexyltrimethoxysilane, N-2-(aminoethyl)-6-aminohexyltriethoxysilane, aminomethyltrimethoxysilane, aminomethyltriethoxysilane, 2-aminoethyltrimethoxysilane, 2-aminoethyltriethoxysilane, 3-aminopropyltrimethoxysilane, 3-aminopropyltriethoxysilane, 4-aminobutyltrimethoxysilane, 4-aminobutyltriethoxysilane, 5-aminopentyltrimethoxysilane, 5-aminopentyltriethoxysilane, 6-aminohexyltrimethoxysilane, 6-aminohexyltriethoxysilane, N-phenylaminomethyltrimethoxysilane, N-phenylaminomethyltriethoxysilane, N-phenyl-2-aminoethyltrimethoxysilane, N-phenyl-2-aminoethyltriethoxysilane, N-phenyl-3-aminopropyltrimethoxysilane, N-phenyl-3-aminopropyltriethoxysilane, N-phenyl-4-aminobutyltrimethoxysilane, N-phenyl-4-aminobutyltriethoxysilane, N-phenyl-5-aminopentyltrimethoxysilane, N-phenyl-5-aminopentyltriethoxysilane, N-phenyl-6-aminohexyltrimethoxysilane, and N-phenyl-6-aminohexyltriethoxysilane.

Examples of compounds in which $R^4$ is a (meth)acryloyl-substituted alkyl group include (meth) acryloxymethyltrimethoxysilane, (meth) acryloxymethyltriethoxysilane, 2-(meth)acryloxyethyltrimethoxysilane, 2-(meth)acryloxyethyltriethoxysilane, 3-(meth)acryloxypropyltrimethoxysilane, 3-(meth)acryloxypropyltriethoxysilane, 4-(meth)acryloxybutyltrimethoxysilane, 4-(meth)acryloxybutyltriethoxysilane, 5-(meth)acryloxypentyltrimethoxysilane, 5-(meth)acryloxypentyltriethoxysilane, 6-(meth)acryloxyhexyltrimethoxysilane, and 6-(meth)acryloxyhexyltriethoxysilane.

Examples of compounds in which $R^4$ is a phenyl-substituted alkyl group include benzyltrimethoxysilane, benzyltriethoxysilane, 2-phenylethyltrimethoxysilane, 2-phenylethyltriethoxysilane, 3-phenylpropyltrimethoxysilane, 3-phenylpropyltriethoxysilane, 4-phenylbutyltrimethoxysilane, 4-phenylbutyltriethoxysilane, 5-phenylpentyltrimethoxysilane, 5-phenylpentyltriethoxysilane, 6-phenylhexyltrimethoxysilane, and 6-phenylhexyltriethoxysilane.

Examples of compounds in which $R^4$ is a cyclohexyl-substituted alkyl group include cyclohexylmethyltrimethoxysilane, cyclohexylmethyltriethoxysilane, 2-cyclohexylethyltrimethoxysilane, 2-cyclohexylethyltriethoxysilane, 3-cyclohexylpropyltrimethoxysilane, 3-cyclohexylpropyltriethoxysilane, 4-cyclohexylbutyltrimethoxysilane, 4-cyclohexylbutyltriethoxysilane, 5-cyclohexylpentyltrimethoxysilane, 5-cyclohexylpentyltriethoxysilane, 6-cyclohexylhexyltrimethoxysilane, and 6-cyclohexylhexyltriethoxysilane.

Examples of compounds in which $R^4$ is a chloro-substituted alkyl group include chloromethyltrimethoxysilane, chloromethyltriethoxysilane, 2-chloroethyltrimethoxysilane, 2-chloroethyltriethoxysilane, 3-chloropropyltrimethoxysilane, 3-chloropropyltriethoxysilane, 4-chlorobutyltrimethoxysilane, 4-chlorobutyltriethoxysilane, 5-chloropentyltrimethoxysilane, 5-chloropentyltriethoxysilane, 6-chlorohexyltrimethoxysilane, and 6-chlorohexyltriethoxysilane.

Examples of compounds in which $R^4$ is an alkenyl group include vinyltrimethoxysilane, vinyltriethoxysilane, allyltrimethoxysilane, allyltriethoxysilane, 3-butenyltrimethoxysilane, 3-butenyltriethoxysilane, 4-pentenyltrimethoxysilane, 4-pentenyltriethoxysilane, 5-hexenyltrimethoxysilane, 5-hexenyltriethoxysilane, 6-heptenyltrimethoxysilane, 6-heptenyltriethoxysilane, 7-octenyltrimethoxysilane, and 7-octenyltriethoxysilane.

Examples of compounds in which $R^4$ is a substituted aryl group include p-styryltrimethoxysilane and p-styryltriethoxysilane.

Preferably, the condensate (A) contains many 3,4-epoxycyclohexyl groups per molecule. The number of 3,4-epoxycyclohexyl groups per molecule is preferably 4 or more, more preferably 5 or more, still more preferably 6 or more, to increase crosslink density during irradiation with active energy rays and enhance the physical properties of the cured product. As the number of 3,4-epoxycyclohexyl groups per molecule is increased, the condensate (A) has a higher molecular weight. As the condensate (A) has a higher molecular weight, 3,4-epoxycyclohexyl groups are more likely to act as functional groups that cause intramolecular crosslinking without contributing to intermolecular crosslinking during curing or that are buried in the molecule without contributing to any crosslinking. For this reason, the number of 3,4-epoxycyclohexyl groups per molecule is preferably 100 or less, more preferably 90 or less, still more preferably 80 or less, still yet more preferably 70 or less, particularly preferably 60 or less.

The condensate (A) is obtained by hydrolysis/condensation with a molar ratio of the silane compound (II) to the silane compound (I) [(the number of moles of the silane compound (II))/(the number of moles of the silane compound (I))] of 0 to 2.0. With a molar ratio of more than 2.0, the effect of suppressing warpage of the resulting laminate relative to a single layer substrate due to shrinkage on curing is insufficient. Also, if the 3,4-epoxycyclohexyl group content in the condensate (A) is reduced, intermolecular crosslinking may be insufficient, resulting in reduced hardness or scratch resistance. For these reasons, in view of hardcoat properties (i.e., hardness and scratch resistance), the molar ratio is preferably 0 to 1.0, more preferably 0 to 0.8, still more preferably 0 to 0.6, particularly preferably 0 to 0.4, most preferably 0 to 0.2.

The condensate (A) has a weight average molecular weight of 20,000 or less. The weight average molecular weight is preferably 500 or more, more preferably 1,000 or more, still more preferably 1,500 or more, still yet more preferably 2,000 or more, particularly preferably 2,800 or more. Also, the weight average molecular weight is more preferably 18,000 or less, still more preferably 16,000 or less, still yet more preferably 14,000 or less, particularly preferably 12,000 or less. The condensate (A) having a weight average molecular weight of less than 500 is volatile and may be partially or entirely volatilized before curing. In addition, the condensate (A) having a lower weight average molecular weight may result in lower impact resistance. The condensate (A) having a weight average molecular weight of more than 20,000 may have lower compatibility with other ingredients, causing white turbidity during the formation of a coating. The weight average molecular weight is measured by GPC.

The ratio (Y/X) of Y to X is 0.2 or less, where X represents the number of moles of $OR^3$ groups directly bonded to silicon atoms in the silane compound (I) and the silane compound (II) which are starting materials of the condensate (A) and Y represents the number of moles of $OR^3$ groups directly bonded to silicon atoms in the condensate (A). If the Y/X ratio is more than 0.2, the coating will shrink over time after irradiation with active energy rays, causing cracks. The Y/X ratio is preferably 0.1 or less, more preferably 0.05 or less, most preferably substantially 0.

The Y/X ratio can be determined by $^1$HNMR.

Moreover, the amount of water required for the hydrolysis/condensation reaction is 0.3 to 3 equivalents, preferably 0.5 to 2 equivalents, relative to the $OR^3$ groups directly bonded to silicon atoms. If the amount of water is less than 0.3 equivalents, some of $OR^3$ groups may remain without being hydrolyzed. If the amount of water is more than 3 equivalents, the rate of hydrolysis/condensation reaction is so high that a high molecular weight condensate may be produced, resulting in a coating having reduced physical properties and reduced transparency.

The number of $OR^3$ groups remaining in the condensate (A) is preferably 2 or less, more preferably 1 or less, still more preferably 0.5 or less, particularly preferably 0.1 or less, most preferably substantially zero, per molecule.

To increase the density of crosslinking points to improve the hardness and scratch resistance of the cured product, the percentage of 3,4-epoxycyclohexyl groups remaining in the condensate (A), or in other words, the ratio of the number of moles of 3,4-epoxycyclohexyl groups in the condensate (A) to the number of moles of 3,4-epoxycyclohexyl groups in the starting material silane compound (I) is preferably high. Specifically, the percentage of remaining 3,4-epoxycyclohexyl groups is preferably 20% or more, more preferably 40% or more, still more preferably 60% or more. The percentage of remaining 3,4-epoxycyclohexyl groups can be determined by $^1$HNMR.

The hydrolysis/condensation reaction is carried out under basic conditions. Alicyclic epoxides such as an epoxycyclohexyl group have reactivity quite different from aliphatic epoxides and can easily undergo an electrophilic reaction but cannot easily undergo a nucleophilic reaction. Thus, ring-opening of epoxy groups easily occurs under acidic conditions, while ring-opening can be suppressed under basic conditions. Accordingly, a condensate synthesized under basic conditions is preferred in view of hardness, scratch resistance and the like because it has a higher percentage of remaining epoxy groups and can form a coating having a higher crosslink density. The pH in the hydrolysis/condensation reaction may be any value within the range of 7 to 14. The range of 8 to 14 is preferred in view of reaction rate. The pH can be measured by a glass electrode method.

Any basic compound may be used to basify the reaction system. Examples include hydroxides of alkali metals or alkaline-earth metals such as sodium hydroxide, lithium hydroxide, and magnesium hydroxide; and amines such as triethylamine. Since after the condensate is synthesized, epoxy groups are cured with a photoacid generator, basic compounds that can be easily removed are preferred. In this view, basic compounds having higher volatility are preferred. Further, those which also have lower nucleophilicity are preferred. Thus, the basic compound is preferably a tertiary amine compound and is more preferably a tertiary amine compound having a boiling point of 30° C. to 160° C. in view of workability. Specific examples include triethylamine, diethylmethylamine, tripropylamine, methyldiisopropylamine, and diisopropylethylamine.

In view of suppressing warpage of the single layer substrate, it is preferred to use a silane compound (II-1) represented by formula (II-1) and optionally a silane compound (II-2) represented by formula (II-2) as the silane compound (II) containing a hydrolyzable silyl group, which is a starting material of the condensate (A), and carry out hydrolysis/condensation at a molar ratio of the silane compound (II-1) to the silane compound (I) of 0.03 to 1.0 and a molar ratio of the silane compound (II-2) to the silane compound (I) of 0 to 1.0.

The silane compound (II-1) containing a hydrolyzable silyl group is represented by the following formula (II-1):

$$R^5\text{—Si}(OR^3)_3 \tag{II-1}$$

wherein $R^5$ is a group selected from a C1-10 alkyl group substituted by a (meth)acryloyl, glycidyl, or thiol group, a C2-10 alkenyl group, and a substituted aryl group, and free of a 3,4-epoxycyclohexyl group; and each $R^3$ is independently a hydrogen atom or a C1-10 alkyl group.

The silane compound (II-2) containing a hydrolyzable silyl group is represented by the following formula (II-2):

$$R^6\text{—Si}(OR^3)_3 \tag{II-2}$$

wherein $R^6$ is a group selected from a C1-10 alkyl group substituted by an amino, phenyl, cyclohexyl, or chloro group, and a C1-10 unsubstituted alkyl group, and free of a 3,4-epoxycyclohexyl group; and each $R^3$ is independently a hydrogen atom or a C1-10 alkyl group.

In view of suppressing warpage of the laminate relative to the single layer substrate, the silane compound (I) can be regarded as an expansion component during curing and the silane compound (II-1) can be regarded as a shrinkage component during curing, and it is possible to suppress warpage resulting from shrinkage on curing by balancing the expansion component and the shrinkage component. The molar ratio of the silane compound (II-1) to the silane compound (I) is preferably 0.05 or more, more preferably 0.075 or more, particularly preferably 0.1 or more. Also, the molar ratio is more preferably 0.9 or less, still more preferably 0.8 or less, particularly preferably 0.6 or less. With a molar ratio of less than 0.03, warpage resulting from expansion on curing may not be suppressed. A molar ratio of more than 1.0 may result in reduction in hardcoat properties (i.e., hardness and scratch resistance).

The silane compound (II-2) cannot be regarded either as an expansion component or a shrinkage component during curing, but acts as a kind of diluent component and can further reduce the effects of the expansion component and the shrinkage component. The molar ratio of the silane compound (II-2) to the silane compound (I) is more preferably 0.8 or less, still more preferably 0.6 or less, particularly preferably 0.5 or less. A molar ratio of more than 1.0 may result in reduction in hardcoat properties (i.e., hardness and scratch resistance).

The curable composition according to one or more embodiments of the present invention that has a higher concentration of the condensate (A) is preferred because the resulting coating has a higher hardness. The solid content concentration of the condensate (A) in the curable composition according to one or more embodiments of the present invention is preferably 60% by weight or more, more preferably 70% by weight or more, still more preferably 80% by weight or more, particularly preferably 90% by weight or more, most preferably 95% by weight or more.

<(B) Photoacid Generator>

The photoacid generator, which is the component (B) in one or more embodiments the present invention, is a compound that generates an acid upon exposure to active energy rays. Examples include strong acids such as toluenesulfonic acid and boron tetrafluoride; onium salts such as sulfonium salts, ammonium salts, phosphonium salts, iodonium salts, and selenium salts; iron-arene complexes; silanol-metal chelate complexes; sulfonic acid derivatives such as disulfones, disulfonyldiazomethanes, disulfonylmethanes, sulfonylbenzoylmethanes, imidosulfonates, and benzoin sulfonates; and compounds that generate an acid upon exposure to radiation as disclosed in JP-A H05-134412, such as organic halogen compounds.

Examples of sulfonic acid derivatives include sulfonic acid esters such as benzoin tosylate, nitrobenzyl tosylate, and succinimide tosylsulfonate as disclosed in U.S. Pat. No. 4,618,564; oxime sulfonates such as α-(4-tosyloxyimino)-4-methoxybenzyl cyanide as disclosed in U.S. Pat. No. 4,540,598 and JP-A H06-67433; tris(methanesulfonyloxy) benzene and the like disclosed in JP-A H06-348015; 9,10-dialkoxyanthracenesulfonic acid nitrobenzyl esters and the like disclosed in JP-A S64-18143; and N-(p-dodecylbenzenesulfonyloxy)-1,8-naphthalimide. Examples of organic halogen compounds include halogen-containing triazine compounds such as 2-(4-methoxyphenyl)-4,6-bis(trichloromethyl)-1,3,5-triazine, 2-(3,4-dimethoxystyryl)-4,6-bis(trichloromethyl)-1,3,5-triazine, and 2-[2-(5-methylfuran-2-yl)vinyl]-4,6-bis(trichloromethyl)-1,3,5-triazine as disclosed in JP-A S55-32070, JP-A S48-36281, and JP-A S63-238339; halogen-containing sulfone compounds such as 2-pyridyl-tribromomethylsulfone as disclosed in JP-A H02-304059; halogenated alkyl phosphate esters such as tris(2-chloropropyl)phosphate, tris(2,3-dichloropropyl)phosphate, and tris(2,3-dibromopropyl)phosphate; halogen-containing heterocyclic compounds such as 2-chloro-6-(trichloromethyl)pyridine; and halogen-containing hydrocarbon compounds such as 1,1-bis[p-chlorophenyl]-2,2,2-trichloroethane, vinylidene chloride copolymers, vinyl chloride copolymers, and chlorinated polyolefins.

Among these photoacid generators, aromatic sulfonium salts or aromatic iodonium salts are preferred in view of easy availability and high stability in the composition containing a condensate (A) of a silane compound containing a 3,4-epoxycyclohexyl group. In particular, the counter anion of the aromatic sulfonium salts or aromatic iodonium salts is preferably a fluorophosphate anion, a fluoroantimonate anion, or a fluoroborate anion to provide rapid curing and excellent adhesion to plastic substrates. It is particularly preferably a fluorophosphate anion or a fluoroantimonate anion. Preferred examples of such photoacid generators are diphenyl(4-phenylthiophenyl)sulfonium•hexafluorophosphate and diphenyl(4-phenylthiophenyl)sulfonium•hexafluoroantimonate.

The amount of the photoacid generator (B) must be adjusted according to the yield and generation rate of the acid, but it is preferably 0.05 to 30 parts by weight, more preferably 0.1 to 10 parts by weight, relative to 100 parts by weight of the condensate (A) (solid content). If the amount of the photoacid generator (B) is less than 0.05 parts by weight, the yield of the acid will be insufficient and the resulting coating tends to have insufficient hardness and insufficient scratch resistance, while an amount of more than 30 parts by weight tends to result in poor coating appearance and coloration.

<(C) Photoradical Generator>

It is preferred to add a photoradical generator in the case where the silane compound (II-1) is used and the group contained in $R^5$ exhibits reactivity with the aid of the photoradical generator. The photoradical generator refers to a compound that generates radicals upon exposure to active energy rays. In the case where the group contained in $R^5$ of the silane compound (II-1) is radically polymerizable, the photoradical generator acts as a polymerization initiator.

Examples of the photoradical generator include carbonyl compounds, sulfur compounds, and acylphosphine oxides. More specific examples include carbonyl compounds such as benzoin, benzoin monomethyl ether, benzoin isopropyl ether, acetoin, benzil, benzophenone, p-methoxybenzophenone, diethoxyacetophenone, benzyl dimethyl ketal, 2,2-diethoxyacetophenone, 1-hydroxycyclohexyl phenyl ketone, methyl phenylglyoxylate, ethyl phenylglyoxylate, and 2-hydroxy-2-methyl-1-phenylpropan-1-one; sulfur compounds such as tetramethylthiurammonosulfide and tetramethylthiuram disulfide; and acylphosphine oxides such as 2,4,6-trimethylbenzoyldiphenylphosphine oxide.

There are commercial products such as IRGACURE series including IRGACURE 184 and IRGACURE 819 and DAROCUR series including DAROCUR 1173 and DAROCUR TPO (all from BASF); KAYACURE series including KAYACURE DETX-S and KAYACURE CTX (all from Nippon Kayaku Co., Ltd.); and TAZ series including TAZ-101 and TAZ-110 (all from Midori Kagaku Co., Ltd.).

These photoradical generators may be used alone or may be used in combinations of multiple kinds in view of curing rate and the like.

The amount of the photoradical generator, if used, must be adjusted according to the yield of radicals and the intended molecular weight, but it is preferably 0.05 parts by weight or more, more preferably 0.1 parts by weight or more, relative to 100 parts by weight of the condensate (A). Also, the amount is preferably 50 parts by weight or less, more preferably 30 parts by weight or less. If the amount of the photoradical generator is less than 0.05 parts by weight, the yield of radicals will be insufficient and the composition may exhibit tack without being cured, while an amount of more than 50 parts by weight tends to result coloration and reduced weather resistance.

<(D) Alicyclic Epoxy Compound>

The active energy ray-curable resin composition according to one or more embodiments of the present invention may contain an alicyclic epoxy compound. Examples of the alicyclic epoxy compound include alicyclic epoxy compounds such as 3,4-epoxycyclohexylmethyl-3',4'-epoxycyclohexane carboxylate (e.g. trade name: Celloxide 2021P (Daicel Corporation)), epsilon-caprolactone modified 3,4-epoxycyclohexylmethyl-3',4'-epoxycyclohexane carboxylate (e.g. trade name: Celloxide 2081 (Daicel Corporation)), 1,2,8,9-diepoxylimonene (e.g. trade name: Celloxide 3000 (Daicel Corporation)), vinylcyclohexene monoxide 1,2-epoxy-4-vinylcyclohexane (e.g. trade name: Celloxide 2000 (Daicel Corporation)), a 1,2-epoxy-4-(2-oxiranyl)cyclohexane adduct of 2,2-bis(hydroxymethyl)-1-butanol (e.g. trade name: EHPE-3150 (Daicel Corporation)), and bis-(3,4-epoxycyclohexyl)adipate; and alicyclic epoxides such as epoxy compounds in which an epoxy group has been added to a cycloaliphatic hydrocarbon directly or via a hydrocarbon, and hetero ring-containing epoxy compounds such as triglycidyl isocyanurate. Among these, epoxy compounds containing an epoxycyclohexyl group are preferred, and 3,4-epoxycyclohexylmethyl-3',4'-epoxycyclohexane carboxylate which is a liquid compound having a low viscosity is more preferred.

The component (D) can be used as a reactive diluent and can improve the workability of the coating solution before irradiation with active energy rays. The amount of the component (D) is preferably 0 to 100 parts by weight, more preferably 0 to 50 parts by weight, relative to 100 parts by weight of the component (A). If the amount of the component (D) is more than 100 parts by weight, hardness or scratch resistance may be reduced.

<(E) Metal Oxide Particles>

Metal oxide fine particles may be used, if necessary, in the active energy ray-curable composition according to one or more embodiments of the present invention. Examples of metal oxide fine particles as the component (E) include silica ($SiO_2$), alumina ($Al_2O_3$), tin oxide ($SnO_2$), zirconia ($ZrO_2$), zinc oxide (ZnO), titania ($TiO_2$), ITO (indium tin oxide), antimony oxide ($Sb_2O_3$, $Sb_2O_5$), and composite fine particles thereof.

Among these, silica, alumina, zirconia, and antimony oxide are preferred in view of high hardness. In particular, silica fine particles and alumina fine particles are preferred in view of easy availability, cost, surface hardness and the like. Silica fine particles are particularly preferred. Each of these may be used alone, or two or more thereof may be used in combination.

Preferably, these metal oxide fine particles are in the form of powder or a sol dispersed in a solvent. In the case where the metal oxide fine particles are in the form of a sol dispersed in a solvent, the dispersion medium is preferably an organic solvent in view of compatibility with other components and dispersibility. Examples of such organic solvents include alcohols such as methanol, ethanol, isopropanol, butanol, and octanol; ketones such as acetone, methyl ethyl ketone, methyl isobutyl ketone, and cyclohexanone; esters such as ethyl acetate, butyl acetate, ethyl lactate, and δ-butyrolactone; ethers such as ethylene glycol monomethyl ether, and diethylene glycol monobutyl ether; aromatic hydrocarbons such as benzene, toluene, and xylene; and amides such as dimethylformamide, dimethylacetamide, and N-methylpyrrolidone. Among there, alcohols, methyl ethyl ketone, methyl isobutyl ketone, ethyl acetate, and butyl acetate are preferred.

The average particle size (average primary particle size) of the metal oxide fine particles, the component (E), is preferably 100 nm or less, more preferably 30 nm or less. If the average particle size is more than 100 nm, the transparency of the resulting coating tends to be impaired.

As for commercial products of silica fine particle dispersions, examples of colloidal silica include methanol silica sol, IPA-ST, MEK-ST, NBA-ST, XBA-ST, DMAC-ST, MIBK-ST, ST-UP, ST-OUP, ST-20, ST-40, ST-C, ST-N, ST-O, ST-50, ST-OL, and the like (all from Nissan Chemical Industries, Ltd.); and OSCAL series and ELECOM series (all from JGC Catalysts and Chemicals Ltd.). Examples of powdered silica include Aerosil 130, Aerosil 300, Aerosil 380, Aerosil TT600, Aerosil OX50, and the like (all from Nippon Aerosil Co., Ltd.); Sildex H31, H32, H51, H52, H121, H122, and the like (all from Asahi Glass Co., Ltd.); E220A, E220, and the like (all from Nippon Silica Industries); SYLYSIA 470 (Fuji Silysia Chemical Ltd.); and SG Flake (Nippon Sheet Glass Co. Ltd.).

Examples of alumina fine particle dispersions include NANOBYK-3601, NANOBYK-3602, NANOBYK-3610, and the like (all from BYK-Chemie Japan KK). Examples of alumina dispersions in isopropanol include AS-150I and the like (Sumitomo Osaka Cement Co., Ltd.). Examples of alumina dispersions in toluene include AS-150T (Sumitomo Osaka Cement Co., Ltd.). Examples of zirconia dispersions in toluene include HXU-110JC (Sumitomo Osaka Cement Co., Ltd.). Examples of alumina, titania, tin oxide, indium oxide, zinc oxide, and the like in the form of powder and in the form of a dispersion in a solvent include NanoTek (trade name, C. I. Kasei Co., Ltd.).

Among these, ELECOM V-8802 and ELECOM V-8804 (both from JGC Catalysts and Chemicals Ltd.) are preferred because their fine particles are highly dispersible in the coating solution and the resulting coating has better properties in terms of transparency, hardness, and scratch resistance.

The addition of the component (E) may further improve the scratch resistance of the resulting coating.

The amount of the component (E) is preferably 0 to 100 parts by weight, more preferably 0 to 50 parts by weight, relative to 100 parts by weight of the component (A). If the amount of the component (E) is more than 100 parts by weight, a coating may not be formable or the resulting coating may have reduced transparency.

The alicyclic epoxy compound (D) and the metal oxide fine particles (E) do not adversely affect the hardness of the coating and thus can be present with the condensate (A) without problems. The total solid content concentration of the condensate (A), the alicyclic epoxy compound (D), and the metal oxide fine particles (E) is preferably 60% by weight or more, more preferably 70% by weight or more, still more preferably 80% by weight or more, particularly preferably 90% by weight or more, most preferably 95% by weight or more, of the weight of the composition. However, since the solvent is also important in adhesion to the substrate, the total solid content concentration of the condensate (A), the alicyclic epoxy compound (D), and the metal oxide fine particles (E) is preferably 30% to 80% by weight, more preferably 40% to 80% by weight, still more preferably 50% to 80% by weight, particularly preferably 60% to 80% by weight, in view of adhesion. A total solid content concentration of more than 80% by weight may cause a decrease in adhesion to the substrate.

<(F) Photosensitizer>

In the active energy ray-curable composition according to one or more embodiments of the present invention, a photosensitizer may be used, if necessary, in order to improve the photosensitivity of the component (B) or the component (C). It is more efficient to use a photosensitizer that can absorb light in a wave range which cannot be absorbed by the component (B) or the component (C) to be used. Thus, it is preferred to use a photosensitizer whose absorption wave range has less overlap with that of the component (B) or the component (C).

Any photosensitizer may be used. Examples include anthracene derivatives, benzophenone derivatives, thioxanthone derivatives, anthraquinone derivatives, and benzoin derivatives. Among these, those having low oxidation potential and high singlet-state or triplet-state excitation energy involved in electron transfer are ideal, and anthracene derivatives, thioxanthone derivatives, and benzophenone derivatives are preferred in view of photoinduced electron-donating properties. More specific examples include 9,10-dialkoxyanthracenes, 2-alkylthioxanthones, 2,4-dialkylthioxanthones, 2-alkylanthraquinones, 2,4-dialkylanthraquinones, p,p'-aminobenzophenones, 2-hydroxy-4-alkoxybenzophenones, and benzoin ethers. Still more specific examples include anthrone, anthracene, 9,10-diphenylanthracene, 9-ethoxyanthracene, pyrene, perylene, coronene, phenanthrene, benzophenone, benzil, benzoin, methyl 2-benzoylbenzoate, butyl 2-benzoylbenzoate, benzoin ethyl ether, benzoin-i-butyl ether, 9-fluorenone, acetophenone, p,p'-tetramethyldiaminobenzophenone, p,p'-tetraethylaminobenzophenone, 2-chlorothioxanthone, 2-isopropylthioxanthone, 2,4-diethylthioxanthone, phenothiazine, acridine orange, benzoflavin, setoflavin-T, 2-nitrofluorene, 5-nitroacenaphthene, benzoquinone, 2-chloro-4-nitroaniline, N-acetyl-p-nitroaniline, p-nitroaniline, N-acetyl-4-nitro-1-naphthylamine, picramide, anthraquinone, 2-ethylanthraquinone, 2-tert-butylanthraquinone, 1,2-benzanthraquinone, 3-methyl-1,3-diaza-1,9-benzanthrone, dibenzalacetone, 1,2-naphthoquinone, 3,3'-carbonylbis(5,7-dimethoxycarbonylcoumarin), 9,10-dibutoxyanthracene, and 9,10-dipropoxyanthracene. These photosensitizers may be used alone or in combinations of two or more thereof.

The amount of the photosensitizer, if used, may be adjusted as appropriate according to the intended curing rate, but it is preferably 0.1 parts by weight or more, more preferably 0.5 parts by weight or more, relative to 100 parts by weight of the photoacid generator (B). Also, the amount is preferably 10 parts by weight or less, more preferably 5 parts by weight or less. If the amount of the photosensitizer is less than 0.1 parts by weight, the intended effect of the photosensitizer will be difficult to achieve, while an amount of more than 10 parts by weight tends to result in coloration of the resulting coating and in an increase in cost.

<Active Energy Ray-Curable Composition>

The active energy ray-curable composition according to one or more embodiments of the present invention contains the components (A) and (B) and optionally the components (C), (D), (E), and (F), and may further contain various additives as appropriate to adjust the physical properties. For example, additives commonly used in coating materials, such as inorganic and organic pigments, plasticizers, dispersants, wetting agents, thickening agents, and defoamers, may be added.

The active energy ray-curable composition according to one or more embodiments of the present invention may further contain a solvent. Any solvent may be used. However, in the case where a plastic substrate, which often has low solvent resistance, is used, preferred are ketones such as methyl isobutyl ketone and diisobutyl ketone, alcohols such as butanol and isopropyl alcohol, esters such as butyl acetate and isopropyl acetate, and ethers such as diethylene glycol methyl ether and propylene glycol methyl ether. In particular, it is preferred to use an ether solvent in an amount of 30% by weight or more of the entire solvent so as not to damage the substrate. The amount of the solvent is preferably 0 to 300 parts by weight, more preferably 0 to 150 parts by weight, relative to the total amount (100 parts by weight) of the components (A), (B), (C), (D), and (E). If the amount of the solvent is more than 300 parts by weight, the substrate may be damaged as described above, which is not preferred.

The active energy ray-curable composition according to one or more embodiments of the present invention may be prepared by any method. For example, conventional methods may be used in which the components are combined and then are mixed with a hand mixer or static mixer, or kneaded with a planetary mixer, DISPER, roller, kneader or the like at room temperature or under heat, or dissolved in a small amount of a suitable solvent and mixed, optionally while being shielded from light.

<Cured Product>

The cured product according to one or more embodiments of the present invention is obtained by curing the active energy ray-curable composition according to one or more embodiments of the present invention. The curing may be carried out by irradiation with active energy rays, for example, visible light, ultraviolet rays, infrared rays, X-rays, α-rays, β-rays, or δ-rays. Most preferred are ultraviolet rays because they allow for a fast reaction rate and a relatively inexpensive active energy ray generator. The dose of active energy rays is preferably a cumulative light dose of 50 to 10,000 mJ/cm$^2$, more preferably 100 to 2,000 mJ/cm$^2$. If the dose of active energy rays is less than 50 mJ/cm$^2$, curing may take longer due to the low light dose, resulting in poor productivity. Conversely, if the dose of active energy rays is more than 10,000 mJ/cm$^2$, the composition may not be cured well and the substrate may be damaged.

The curing temperature is not particularly limited, but is usually preferably 100° C. or less, more preferably 80° C. or less, still more preferably 50° C. or less. Curing at a temperature above 100° C. may cause increased strain due to the difference in linear expansion between the cured product and the substrate. Curing at room temperature is particularly preferred.

<Laminate>

A laminate can be produced using the active energy ray-curable composition according to one or more embodiments of the present invention. The laminate according to one or more embodiments of the present invention can be obtained by a production method including the steps of: applying the active energy ray-curable composition according to one or more embodiments of the present invention to a substrate; and curing the active energy ray-curable composition by irradiation with active energy rays to form a cured coating.

Any substrate may be used and various substrates described later can be used.

The laminate according to one or more embodiments of the present invention can be suitably used for the front panel of personal computers, or the like, automobile window glass, and the like.

The active energy ray-curable composition according to one or more embodiments of the present invention can be suitably used to coat buildings, household electric appliances, industrial equipment, or the like which are formed of metals, ceramics, glass, cement, ceramic-based substrates, plastics, films, sheets, wood, paper, fibers, or the like. In particular, the active energy ray-curable composition can be suitably used for plastics, films, sheets and other substrates made of acrylic resin, polycarbonate resin, PET resin, or the like because they can be easily irradiated with active energy rays.

The substrate is preferably a single layer substrate in the case where the component (A) of the active energy ray-curable composition is a condensate obtained by hydrolysis/condensation of the silane compounds (I) and (II-1) and optionally the silane compound (II-2) at the molar ratio described above. Any single layer substrate may be used, and the substrate may be formed from multiple compounds. To take the advantage of curing by irradiation with active energy rays, i.e., that high temperature heat is not required during curing, resin substrates are preferred. Examples include plastics, films, sheets and other substrates made of acrylic resin, polycarbonate resin, PET resin, or the like.

Examples of acrylic resin substrates include Sumipex and Technolloy (both from Sumika Acryl Co., Ltd.), Acryplen and Acrylite (both from Mitsubishi Rayon Co., Ltd.), Paraglass and Comoglass (both from Kuraray Co., Ltd.), Deraglass and Deraprism (both from Asahikasei Technoplus Corporation), and KanaseLite (Kanase Industries Co., Ltd.).

Examples of polycarbonate resin substrates include Carboglass (Asahi Glass Co., Ltd.), Iris Polycarbonate Sheet (Irisshinyo Co., Ltd.), Lupilon (Mitsubishi Gas Chemical Company, Inc.), Panlite (Teijin Limited), Polycarbonate Plate (Takiron Co., Ltd.), Polyca-Ace (Sumitomo Bakelite Co., Ltd.), Polycarbonate Plate (Sekisui Seikei Co., Ltd.), and PC Mirror (Ryoko Co., Ltd.).

Examples of PET resin substrates include Petace (Sumitomo Bakelite Co., Ltd.), Estella and Estella Super (Sekisui Seikei Co., Ltd.), PETELLUS (Mitsubishi Plastics, Inc.), PETEC (Takiron Co., Ltd.), Mineron (Mineron Kasei Co., Ltd.), Polytech A-PET sheet (Polytech Incorporated), A-PET resin sheet (Teijin Limited), Lumirror (Toray Industries, Inc.), and Cosmoshine (Toyobo Co., Ltd.).

Multilayer substrates can be similarly suitably used as long as their layers have almost the same linear expansion coefficient and almost the same moisture absorbency and they are almost free from warpage even after an environmental test.

The thickness of the single layer substrate is preferably 5 mm or less, more preferably 4 mm or less, still more preferably 3 mm or less. A single layer substrate having a thickness of more than 5 mm is less likely to be affected by contraction/expansion of the coating because of due to the large stiffness effect of the substrate itself.

The coating thickness is preferably 1 to 100 μm. A coating having a thickness of less than 1 μm can be easily affected by the hardness of the substrate (e.g., plastic, film, or sheet) itself and tends to have insufficient hardness. If the coating thickness is more than 100 μm, active energy rays cannot reach into the depth and the curing tends to be retarded. If a coating thickness of 100 μm or more is desired, it is preferred to repeat several cycles of coating and irradiation with active energy rays.

EXAMPLES

Embodiments of the present invention are described with reference to examples, but the present invention is not limited to these examples.

The following starting materials were used in the examples and comparative examples.
A-186: Momentive Performance Materials Japan LLC, β-(3,4-epoxycyclohexyl)ethyltrimethoxysilane
A-187: Momentive Performance Materials Japan LLC, 3-glycidoxypropyltrimethoxysilane
CELLOXIDE 2021P: Daicel Corporation, 3,4-epoxycyclohexylmethyl-3',4'-epoxycyclohexane carboxylate ELECOM V-8804: JGC Catalysts and Chemicals Ltd., organosilicasol (average particle size of silica: about 10 nm) in propylene glycol monomethyl ether
CPI-101A: San-Apro Ltd., triarylsulfonium.$SbF_6$ salt in propylene carbonate
A-174: Momentive Performance Materials Japan LLC, γ-methacryloxypropyltrimethoxysilane
A-171: Momentive Performance Materials Japan LLC, vinyltrimethoxysilane
KBM-5103: Shin-Etsu Chemical Co., Ltd., 3-acryloyloxypropyltrimethoxysilane
Magnesium chloride: Wako Pure Chemical Industries, Ltd., special grade
1-Methoxy-2-propanol: Daicel Corporation
Methanol: Mitsubishi Gas Chemical Company, Inc.
Substrate A: PET film (Toyobo Co., Ltd., Cosmoshine A4300, 250 μm thick)
Substrate B: acrylic sheet (Sumika Acryl Co., Ltd., Technolloy S001, 0.5 mm thick)
Substrate C: polycarbonate sheet (Teijin Limited, Panlite AD-5503) formed to a thickness of 1.0 mm Synthesis Examples 1 to 10

The components shown in Table 1 (amounts are given in parts by weight) were charged into a reaction vessel equipped with a stirrer, a thermometer, and a reflux condenser. The mixture was heated to 60° C. and stirred for 5 hours, followed by devolatilization under reduced pressure at 60° C. to give a condensate.

The condensates thus prepared were measured by NMR in acetone-d6 solvent to calculate the ratio (Y/X) of Y to X, where Y represents the number of moles of $OR^3$ groups directly bonded to silicon atoms in the condensate and X represents the number of moles of $OR^3$ groups directly bonded to silicon atoms in the starting material silane compound. The condensates were also measured by $^1HNMR$ to calculate the percentage of remaining 3,4-epoxycyclohexyl groups. The weight average molecular weight was measured by GPC (Table 1).

TABLE 1

| | Synthesis Examples | | | | | | | | | |
|---|---|---|---|---|---|---|---|---|---|---|
| | 1 | 2 | 3 | 4 | 5 | 6 | 7 | 8 | 9 | 10 |
| A-186 | 100 | 100 | 100 | 100 | 100 | | 100 | 100 | 100 | 100 |
| Dimethyldimethoxysilane | | | | | 32.5 | | 150 | | | 19.5 |
| A-187 | | | | | | 100 | | | | |
| Methacryloxypropyltrimethoxysilane | | 20 | | | | | | | | |
| Water | 17.5 | 15.8 | | 11.0 | 52.2 | 18.3 | 122.1 | 6.6 | | |
| Triethylamine | 2.4 | 2.7 | | 2.2 | 3.7 | 2.4 | 7.4 | 2.1 | | |

TABLE 1-continued

|  | Synthesis Examples | | | | | | | | | |
|---|---|---|---|---|---|---|---|---|---|---|
|  | 1 | 2 | 3 | 4 | 5 | 6 | 7 | 8 | 9 | 10 |
| Sodium hydroxide aqueous solution (0.01 mol/L) |  |  | 21.9 |  |  |  |  |  |  |  |
| Hydrochloric acid (0.05 mol/L) |  |  |  |  |  |  |  |  | 17.5 | 44.5 |
| Weight average molecular weight | 8053 | 8420 | 8230 | 6350 | 9200 | 4520 | 6230 | 1600 | 3400 | 3500 |
| Y/X | ≤30.2 | ≤0.2 | ≤0.2 | ≤0.2 | ≤0.2 | ≤0.2 | ≤0.2 | 0.5 | 0.4 | 0.4 |
| Percentage of remaining 3,4-epoxycyclohexyl groups (%) | >90 | >90 | >90 | >90 | >90 | 80 | >90 | >90 | 10 | 10 |

Examples 1 to 8 and Comparative Examples 1 to 8

The components were combined as shown in Table 2 or 3 (amounts are given in parts by weight) to prepare a coating solution. The condensates obtained in Synthesis Examples 1 to 10 and A-186 were diluted in propylene glycol monomethyl ether to a non-volatile content of 50% by weight before use. The coating solutions thus prepared were each applied to a PET film (150 mm×100 mm×250 μm) using a bar coater No. 40 to a dry film thickness of about 20 μm, and dried at 80° C. for two minutes to remove the solvent. Then, they were cured by irradiation with active energy rays using a high pressure mercury lamp in the air at 240 mW in such a manner that the cumulative dose of light having a wavelength of 310 to 390 nm was 1000 mJ/cm$^2$. Thus, test pieces were prepared.

The test pieces were evaluated for physical properties (Tables 2 and 3).

TABLE 2

|  | Examples | | | | | | | |
|---|---|---|---|---|---|---|---|---|
|  | 1 | 2 | 3 | 4 | 5 | 6 | 7 | 8 |
| Synthesis Example 1 (50% solution) | 100 |  |  | 100 | 100 | 100 | 100 |  |
| Synthesis Example 2 (50% solution) |  |  |  |  |  |  |  | 100 |
| Synthesis Example 3 (50% solution) |  | 100 |  |  |  |  |  |  |
| Synthesis Example 4 (50% solution) |  |  | 100 |  |  |  |  |  |
| CELLOXIDE 2021P |  |  |  |  | 21.4 |  | 21.4 |  |
| ELECOM V-8804 |  |  |  |  |  | 53.6 | 76.5 |  |
| CPI-101A | 2.5 | 2.5 | 2.5 | 3.6 | 2.5 | 3.6 | 1.5 | 2.5 |
| Propylene glycol monomethyl ether | 61.6 | 61.6 | 61.6 | 109.4 | 75.0 | 128.5 |  |  |
| Coating appearance (cracks) | Absent | Absent | Absent | Absent | Absent | Absent | Absent | Absent |
| Film thickness (μm) | 20.5 | 20.2 | 20.8 | 21.1 | 20.3 | 20.5 | 19.8 | 19.1 |
| Pencil hardness | 8 H | 8 H | 8 H | 8 H | 8 H | 8 H | 8 H | 8 H |
| Scratch resistance | A | A | A | A | A | A | A | A |
| Impact resistance | 100 cm | 100 cm | 100 cm | 100 cm | 100 cm | 100 cm | 100 cm | 100 cm |
| Warpage (mm) PET film substrate | −0.8 | −1 | −0.7 | −0.6 | −0.8 | −0.7 | −0.6 | −0.1 |

TABLE 3

|  | Comparative Examples | | | | | | | |
|---|---|---|---|---|---|---|---|---|
|  | 1 | 2 | 3 | 4 | 5 | 6 | 7 | 8 |
| A186 (50% solution) | 100 |  |  |  |  |  |  |  |
| Synthesis Example 5 (50% solution) |  | 100 |  |  |  |  |  |  |
| Synthesis Example 6 (50% solution) |  |  | 100 |  |  |  |  |  |
| Synthesis Example 7 (50% solution) |  |  |  | 100 |  |  |  |  |
| Synthesis Example 8 (50% solution) |  |  |  |  |  | 100 |  |  |
| Synthesis Example 9 (50% solution) |  |  |  |  |  |  | 100 |  |
| Synthesis Example 10 (50% solution) |  |  |  |  |  |  |  | 100 |
| Trimethylolpropane triacrylate |  |  |  |  | 50.0 |  |  |  |
| 1,6-Hexanediol diacrylate |  |  |  |  | 50.0 |  |  |  |
| CPI-101A | 2.5 | 2.5 | 2.5 | 2.5 |  | 2.5 | 2.5 | 2.5 |
| 2-Hydroxy-2-methyl-1-phenylpropan-1-one |  |  |  |  | 5.0 |  |  |  |
| Propylene glycol monomethyl ether | 61.5 | 61.6 | 61.5 | 61.5 | 223.1 | 61.5 | 61.5 | 61.5 |
| Coating appearance (cracks) | Present | Absent | Absent | Absent | Absent | Present | Present | Present |
| Film thickness (μm) | — | 21.0 | 18.0 | 20.2 | 16.2 | — | — | — |
| Pencil hardness | — | 5 H | 2 H | 4 H | 4 H | — | — | — |
| Scratch resistance | — | B | C | B | B | — | — | — |
| Impact resistance | — | 100 cm | 50 cm | 100 cm | 40 cm | — | — | — |
| Warpage (mm) PET film substrate | — | 0.2 | −0.2 | −0.4 | 2.1 | — | — | — |

(Evaluation of Physical Properties)

Film Thickness

Seven days after irradiation with active energy rays, the test pieces were measured using a film thickness meter and the thickness of the substrate was subtracted to calculate the film thickness.

Hardness

Seven days after irradiation, pencil hardness was evaluated in accordance with JIS K5600.

Scratch Resistance

Seven days after irradiation, steel wool #0000 was moved back and forth on the test pieces 1000 times under a load of 500 g/cm$^2$ using an eraser abrasion tester (Mistumoto Seisakusho), and then the number of scratches left on the coating was observed.

A: no scratches or three or fewer scratches
B: 4 to 10 shallow scratches
C: more than 10 scratches or deep scratches Impact Resistance Seven days after irradiation, a steel ball (22 g) was dropped onto the center of each test piece (10 cm$^2$) and the height at which the coating was cracked was measured.

Warpage

Seven days after irradiation with active energy rays, the laminates were stored in a high-temperature and high-humidity chamber (85° C., 85%) for 72 hours. Four hours after removal from the chamber, the laminates were placed on a horizontal platform, with the coating facing up. The vertical distances between the top face of the platform and the four vertices of the top face of the laminate were measured and the average was calculated. The values are shown as positive values in the case where the laminate was warped toward the coated side (i.e., the edges of the bottom face of the laminate were lifted off the surface of the platform) and negative values in the opposite case.

The result of evaluation of the PET film substrate alone under the same conditions was 0 mm.

The results of Examples 1 to 8 demonstrated that the cured products of the curable compositions containing a condensate (A) were free from crack formation even when the dry film thickness was 10 µm or more, exhibiting excellent properties in hardness, scratch resistance, and impact resistance at the same time. In contrast, in Comparative Examples 1 and 6 to 8, curing of β-(3,4-epoxycyclohexyl)ethyltrimethoxysilane caused shrinkage on curing associated with the reaction of the alkoxysilane, so that cracks were formed in the coating and thus the film thickness and physical properties could not be measured. In Comparative Example 2, the hardness and scratch resistance were both insufficient. In Comparative Example 3, the hardness and scratch resistance were both found to be greatly poor compared to the examples because the glycidoxy group in the condensate had a lower cationic polymerizability than an epoxycyclohexyl group. In Comparative Example 4, the hardness and scratch resistance were both found to be poor compared to the examples because the amount of the silane compound containing an epoxycyclohexyl group used as a starting material of the condensate was too small to provide sufficient crosslink density. In the results of Comparative Example 5 in which a polyfunctional acrylate was cured using a photoradical generator, shrinkage on curing was significant and the impact resistance was also poor as compared to the examples.

Examples 1 to 8 show increased suppression of warpage compared to Comparative Example 5.

Synthesis Examples 11 to 23

The components shown in Table 4 were charged into a reaction vessel equipped with a stirrer, a thermometer, and a reflux condenser. The mixture was heated to 130° C. and stirred for 5 hours, followed by devolatilization under reduced pressure at 70° C. to give a condensate.

The molar ratio Y/X, the percentage of remaining 3,4-epoxycyclohexyl groups, and the weight average molecular weight of the condensates thus prepared were measured.

TABLE 4

| | Synthesis Examples | | | | | | | | | | | | |
|---|---|---|---|---|---|---|---|---|---|---|---|---|---|
| | 11 | 12 | 13 | 14 | 15 | 16 | 17 | 18 | 19 | 20 | 21 | 22 | 23 |
| A-186 | 100 | 100 | 100 | 100 | 100 | 100 | 100 | 100 | 100 | 100 | 100 | 100 | 100 |
| A-174 | 5.3 | 25.2 | 82.5 | | | | | | | 25.2 | 151.3 | 403.4 | 25.2 |
| A-171 | | | | 3.2 | 15.0 | 49.2 | | | | | | | |
| KBM-5103 | | | | | | | 5.0 | 23.8 | 77.8 | | | | |
| Water | 13.8 | 16.4 | 23.9 | 13.8 | 16.4 | 23.9 | 13.8 | 16.4 | 23.9 | 8.2 | 32.9 | 65.8 | |
| Magnesium hydroxide | 0.011 | 0.013 | 0.018 | 0.010 | 0.012 | 0.015 | 0.011 | 0.012 | 0.018 | 0.013 | 0.010 | 0.010 | |
| Hydrochloric acid (0.05 mol/L) | | | | | | | | | | | | | 16.4 |
| Methanol | 13.8 | 16.4 | 23.9 | 13.8 | 16.4 | 23.9 | 13.8 | 16.4 | 23.9 | 8.2 | 32.9 | 65.8 | 16.4 |
| Weight average molecular weight | 3200 | 2800 | 3000 | 3200 | 4600 | 3600 | 3200 | 2900 | 2600 | 1900 | 4200 | 5200 | 3200 |
| Y/X | ≤0.2 | ≤0.2 | ≤0.2 | ≤0.2 | ≤0.2 | ≤0.2 | ≤0.2 | ≤0.2 | ≤0.2 | 0.5 | ≤0.2 | ≤0.2 | 0.4 |
| Percentage of remaining 3,4-epoxycyclohexyl groups (%) | >90 | >90 | >90 | >90 | >90 | >90 | >90 | >90 | >90 | >90 | >90 | >90 | 10 |

Examples 9 to 20 and Comparative Examples 9 to 14

The components were combined as shown in Table 5 or 6 (amounts are given in parts by weight) to prepare a coating solution. The condensates obtained in Synthesis Examples 11 to 23 were diluted in propylene glycol monomethyl ether to a non-volatile content of 50% before use. The coating solutions thus prepared were applied to various substrates having a size of 210 mm×297 mm (an acrylic sheet in Example 20, a polycarbonate sheet in Example 21, and a PET film in the other examples and comparative examples) using a bar coater No. 30 to a dry film thickness of about 20 µm, and dried at 80° C. for two minutes to remove the solvent. Then, they were cured by irradiation with active energy rays using a high pressure mercury lamp in the air at 240 mW in such a manner that the cumulative dose of light having a wavelength of 310 to 390 nm was 1000 mJ/cm$^2$. Thus, test pieces were prepared.

The test pieces were evaluated for physical properties (Tables 5 and 6). Warpage was evaluated also immediately after 7 day aging.

TABLE 5

| | Examples | | | | | | | | | | | |
|---|---|---|---|---|---|---|---|---|---|---|---|---|
| | 9 | 10 | 11 | 12 | 13 | 14 | 15 | 16 | 17 | 18 | 19 | 20 |
| Synthesis Example 11 (50% solution) | 100 | | | | | | | | | 100 | 100 | 100 |
| Synthesis Example 12 (50% solution) | | 100 | | | | | | | | | | |
| Synthesis Example 13 (50% solution) | | | 100 | | | | | | | | | |
| Synthesis Example 14 (50% solution) | | | | 100 | | | | | | | | |
| Synthesis Example 15 (50% solution) | | | | | 100 | | | | | | | |
| Synthesis Example 16 (50% solution) | | | | | | 100 | | | | | | |
| Synthesis Example 17 (50% solution) | | | | | | | 100 | | | | | |
| Synthesis Example 18 (50% solution) | | | | | | | | 100 | | | | |
| Synthesis Example 19 (50% solution) | | | | | | | | | 100 | | | |
| Synthesis Example 20 (50% solution) | | | | | | | | | | | | |
| Synthesis Example 21 (50% solution) | | | | | | | | | | | | |
| Synthesis Example 22 (50% solution) | | | | | | | | | | | | |
| Synthesis Example 23 (50% solution) | | | | | | | | | | | | |
| Trimethylolpropane triacrylate | | | | | | | | | | | | |
| 1,6-Hexanediol diacrylate | | | | | | | | | | | | |
| 2-Hydroxy-2-methyl-1-phenylpropan-1-one | 3.0 | 3.0 | 3.0 | 3.0 | 3.0 | 3.0 | 3.0 | 3.0 | 3.0 | 3.0 | 3.0 | 3.0 |
| ELECOM V-8804 | | | | | | | | | | 53.6 | | |
| CPI-101A | 2.5 | 2.5 | 2.5 | 2.5 | 2.5 | 2.5 | 2.5 | 2.5 | 2.5 | 1.8 | 2.5 | 2.5 |
| Propylene glycol monomethyl ether | 17.8 | 17.8 | 17.8 | 17.8 | 17.8 | 17.8 | 17.8 | 17.8 | 17.8 | 11.0 | 17.8 | 17.8 |
| Substrate type | A | A | A | A | A | A | A | A | A | A | B | C |
| Film thickness (μm) | 19.8 | 21.0 | 20.2 | 20.2 | 21.0 | 20.2 | 21.0 | 21.0 | 20.2 | 20.4 | 20.0 | 19.2 |
| Pencil hardness | 8 H | 7 H | 6 H | 8 H | 7 H | 6 H | 8 H | 7 H | 7 H | 8 H | 8 H | 4 H |
| Scratch resistance | A | A | A | A | A | A | A | A | A | A | A | A |
| Warpage (mm) | −0.1 | −0.2 | 0.1 | 0.1 | −0.2 | 0.1 | −0.2 | −0.2 | 0.1 | −0.1 | 0.1 | −0.2 |
| Warpage (mm) after aging at temperature of 85° C. and humidity of 85% for 72 hours | 0.1 | 0.1 | 0.2 | 0.2 | 0.1 | 0.2 | 0.1 | 0.1 | 0.2 | 0.1 | 0.3 | −0.1 |

TABLE 6

| | Comparative Examples | | | | | |
|---|---|---|---|---|---|---|
| | 9 | 10 | 11 | 12 | 13 | 14 |
| Synthesis Example 11 (50% solution) | | | | | | |
| Synthesis Example 12 (50% solution) | | | | | | |
| Synthesis Example 13 (50% solution) | | | | | | |
| Synthesis Example 14 (50% solution) | | | | | | |
| Synthesis Example 15 (50% solution) | | | | | | |
| Synthesis Example 16 (50% solution) | | | | | | |
| Synthesis Example 17 (50% solution) | | | | | | |
| Synthesis Example 18 (50% solution) | | | | | | |
| Synthesis Example 19 (50% solution) | | | | | | |
| Synthesis Example 20 (50% solution) | | | 100 | | | |
| Synthesis Example 21 (50% solution) | | | | 100 | | |
| Synthesis Example 22 (50% solution) | | | | | 100 | |
| Synthesis Example 23 (50% solution) | | | | | | 100 |
| Trimethylolpropane triacrylate | 100 | | | | | |
| 1,6-Hexanediol diacrylate | | 100 | | | | |
| 2-Hydroxy-2-methyl-1-phenylpropan-1-one | 3.0 | 3.0 | | 3.0 | 3.0 | 3.0 |
| ELECOM V-8804 | | | | | | |
| CPI-101A | | | 2.5 | 2.5 | 2.5 | 2.5 |
| Propylene glycol monomethyl ether | 125.9 | 125.9 | 14.2 | 17.8 | 17.8 | 17.8 |
| Substrate type | A | A | A | A | A | A |
| Film thickness (μm) | 19.5 | 19.2 | 18.9 | 19.5 | 19.2 | 20.5 |
| Pencil hardness | 6 H | 6 H | 8 H | 8 H | 4 H | 3 H |
| Scratch resistance | B | B | A | B | C | C |
| Warpage (mm) immediately after 7 day aging | 1.2 | 1.0 | 1.5 | 2.1 | 2.3 | 1.2 |
| Warpage (mm) after aging at temperature of 85° C. and humidity of 85% for 72 hours | 2.3 | 1.9 | 3.2 | 2.3 | 1.9 | 2.2 |

The results of Examples 9 to 20 demonstrated that the cured products of the curable compositions containing a condensate (A) exhibited excellent properties in hardness, scratch resistance, and warpage at the same time.

In contrast, in Comparative Examples 9 and 10, curing caused shrinkage on curing associated with the polymerization of acrylate groups, resulting in great warpage.

In Comparative Example 11, shrinkage on curing and warpage were greater than Example 9 because 50% of unhydrolyzed alkoxy groups remained in the condensate (A) and they reacted during the preparation of a laminate.

In Comparative Examples 12 and 13, shrinkage on curing associated with the polymerization of methacrylate groups and great warpage occurred because the condensate (A) contained too many methacryloyl groups.

In Comparative Example 14, great shrinkage on curing and great warpage occurred as in Comparative Example 11 because 40% of alkoxy groups remained in the condensate (A); and the hardness and scratch resistance were reduced compared to Example 9 because the epoxycyclohexyl groups had been hydrolyzed due to the use of an acid catalyst during the preparation of the condensate.

The invention claimed is:

1. An active energy ray-curable composition, comprising:
   (A) 100 parts by weight of a condensate having a weight average molecular weight of 20,000 or less, and
   (B) 0.05 to 10 parts by weight of a photoacid generator,
   the condensate (A) being obtained by hydrolysis/condensation under only basic conditions of:
   (I) a silane compound containing a hydrolyzable silyl group represented by the following formula (I):

wherein $R^1$ is a C1-10 alkyl group terminally substituted by a 3,4-epoxycyclohexyl group; each $R^2$ is independently a hydrogen atom or a monovalent hydrocarbon group selected from a C1-10 alkyl group, a C6-25 aryl group, and a C7-12 aralkyl group; each $R^3$ is independently a hydrogen atom or a C1-10 alkyl group; and a is an integer of 0 to 2;
   wherein a ratio (Y/X) of Y to X is 0.2 or less, where X represents the number of moles of $OR^3$ groups directly bonded to silicon atoms in the silane compound (I) which is a starting material of the condensate (A) and Y represents the number of moles of $OR^3$ groups directly bonded to silicon atoms in the condensate (A).

2. The active energy ray-curable composition according to claim 1, wherein $R^1$ is a β-(3,4-epoxycyclohexyl)ethyl group.

3. The active energy ray-curable composition according to claim 1, further comprising:
   (D) an alicyclic epoxy compound.

4. The active energy ray-curable composition according to claim 3, wherein the alicyclic epoxy compound (D) is 3,4-epoxycyclohexylmethyl-3',4'-epoxycyclohexane carboxylate.

5. The active energy ray-curable composition according to claim 1, further comprising:
   (E) metal oxide fine particles having an average particle size of 100 nm or less.

6. The active energy ray-curable composition according to claim 5, wherein the metal oxide fine particles (E) are silica fine particles.

7. The active energy ray-curable composition according to claim 1, wherein the active energy ray-curable composition comprises, relative to 100 parts by weight of the condensate (A), 0 to 100 parts by weight of the alicyclic epoxy compound (D), and 0 to 100 parts by weight of the metal oxide fine particles (E).

8. The active energy ray-curable composition according to claim 1, wherein the photoacid generator (B) is an aromatic sulfonium salt or an aromatic iodonium salt.

9. The active energy ray-curable composition according to claim 8, wherein the photoacid generator (B) contains a fluorophosphate anion or a fluoroantimonate anion as a counter anion.

10. The active energy ray-curable composition according to claim 1, further comprising:
    a photosensitizer (F).

11. The active energy ray-curable composition according to claim 10, wherein the photosensitizer (F) is an anthracene derivative, a thioxanthone derivative, or a benzophenone derivative.

12. A cured product, obtained by curing the active energy ray-curable composition according to claim 1.

13. A method for producing a laminate, the method comprising the steps of:
    applying the active energy ray-curable composition according to claim 1 to a substrate; and
    curing the active energy ray-curable composition by irradiation with active energy rays to form a cured coating.

14. A laminate, obtained by the production method according to claim 13.

15. The laminate according to claim 14, wherein the laminate is obtained using a single layer substrate and an active energy ray-curable composition comprising:
    (A) a condensate having a weight average molecular weight of 20,000 or less, and
    (B) a photoacid generator,
    the condensate (A) being obtained by hydrolysis/condensation under only basic conditions of:
    (I) a silane compound containing a hydrolyzable silyl group represented by the following formula (I):

wherein $R^1$ is a C1-10 alkyl group terminally substituted by a 3,4-epoxycyclohexyl group; each $R^2$ is independently a hydrogen atom or a monovalent hydrocarbon group selected from a C1-10 alkyl group, a C6-25 aryl group, and a C7-12 aralkyl group; each $R^3$ is independently a hydrogen atom or a C1-10 alkyl group; and a is an integer of 0 to 2;
    wherein a ratio (Y/X) of Y to X is 0.2 or less, where X represents the number of moles of $OR^3$ groups directly bonded to silicon atoms in the silane compound (I) which is a starting material of the condensate (A) and Y represents the number of moles of $OR^3$ groups directly bonded to silicon atoms in the condensate (A).

16. The active energy ray-curable composition according to claim 1, wherein the condensate (A) is obtained by hydrolysis/condensation of:
    (I) the silane compound of formula (I); and
    (II) a silane compound containing a hydrolyzable silyl group represented by the following formula (II):

wherein $R^4$ is a group selected from a C1-10 substituted or unsubstituted alkyl group, an alkenyl group, and a substituted aryl group, and free of a 3,4-epoxycyclohexyl group; and each $R^3$ is independently a hydrogen atom or a C1-10 alkyl group,
    at a molar ratio of the silane compound (II) to the silane compound (I) of 2.0 or less under basic conditions.

17. The active energy ray-curable composition according to claim 16, wherein the condensate (A) is obtained by hydrolysis/condensation using as the silane compound (II) a silane compound containing a hydrolyzable silyl group represented by the following formula (II-1):

wherein $R^5$ is a group selected from a C1-10 alkyl group substituted by a (meth)acryloyl, glycidyl, or thiol group, a C2-10 alkenyl group, and a substituted aryl group, and free of a 3,4-epoxycyclohexyl group; and each $R^3$ is independently a hydrogen atom or a C1-10 alkyl group, and
    a silane compound containing a hydrolyzable silyl group represented by the following formula (II-2):

wherein $R^6$ is a group selected from a C1-10 alkyl group substituted by an amino, phenyl, cyclohexyl, or chloro group, and a C1-10 unsubstituted alkyl group, and free of a 3,4-epoxycyclohexyl group; and each $R^3$ is independently a hydrogen atom or a C1-10 alkyl group, at a molar ratio of the silane compound (II-1) to the silane compound (I) of 0.03 to 1.0 and a molar ratio of the silane compound (II-2) to the silane compound (I) of 0 to 1.0.

18. An active energy ray-curable composition, comprising:
   (A) a condensate having a weight average molecular weight of 20,000 or less,
   (B) a photoacid generator, and
   (D) an alicyclic epoxy compound;
   the condensate (A) being obtained by hydrolysis/condensation under only basic conditions of:
      (I) a silane compound containing a hydrolyzable silyl group represented by the following formula (I):

$$R^1-(SiR^2_a(OR^3)_{3-a}) \qquad (I)$$

wherein $R^1$ is a C1-10 alkyl group terminally substituted by a 3,4-epoxycyclohexyl group; each $R^2$ is independently a hydrogen atom or a monovalent hydrocarbon group selected from a C1-10 alkyl group, a C6-25 aryl group, and a C7-12 aralkyl group; each $R^3$ is independently a hydrogen atom or a C1-10 alkyl group; and a is an integer of 0 to 2;
   wherein a ratio (Y/X) of Y to X is 0.2 or less, where X represents the number of moles of $OR^3$ groups directly bonded to silicon atoms in the silane compound (1) which is a starting material of the condensate (A) and Y represents the number of moles of $OR^3$ groups directly bonded to silicon atoms in the condensate (A).

19. An active energy ray-curable composition, comprising:
   (A) a condensate having a weight average molecular weight of 20,000 or less, and
   (B) a photoacid generator,
   the condensate (A) being obtained by hydrolysis/condensation under only basic conditions of:
      (I) a silane compound containing a hydrolyzable silyl group represented by the following formula (I):

$$R^1-(SiR^2_a(OR^3)_{3-a}) \qquad (I)$$

wherein $R^1$ is a C1-10 alkyl group terminally substituted by a 3,4-epoxycyclohexyl group; each $R^7$ is independently a hydrogen atom or a monovalent hydrocarbon group selected from a C1-10 alkyl group, a C6-25 aryl group, and a C7-12 aralkyl group; each $R^3$ is independently a hydrogen atom or a C1-10 alkyl group; and a is an integer of 0 to 2; and
   (II) a silane compound containing a hydrolyzable silyl group represented by the following formula (11):

$$R^4-Si(OR^3)_3 \qquad (II)$$

wherein $R^4$ is a group selected from a C1-10 substituted or unsubstituted alkyl group, an alkenyl group, and a substituted aryl group, and free of a 3,4-epoxycyclohexyl group; and each $R^3$ is independently a hydrogen atom or a C1-10 alkyl group,
   at a molar ratio of the silane compound (II) to the silane compound (I) of 2.0 or less, and
   wherein the condensate (A) is obtained by hydrolysis/condensation using as the silane compound (II) a silane compound containing a hydrolyzable silyl group represented by the following formula (II-1):

$$R^5-Si(OR^3)_3 \qquad (II-1)$$

wherein $R^5$ is a group selected from a C1-10 alkyl group substituted by a (meth)acryloyl, glycidyl, or thiol group, a C2-10 alkenyl group, and a substituted aryl group, and free of a 3,4-epoxycyclohexyl group; and each $R^3$ is independently a hydrogen atom or a C1-10 alkyl group, and
   a silane compound containing a hydrolyzable silyl group represented by the following formula (II-2):

$$R^6-Si(OR^3)_3 \qquad (II-2)$$

wherein $R^6$ is a group selected from a C1-10 alkyl group substituted by an amino, phenyl, cyclohexyl, or chloro group, and a C1-10 unsubstituted alkyl group, and free of a 3,4-epoxycyclohexyl group; and each $R^3$ is independently a hydrogen atom or a C1-10 alkyl group,
   at a molar ratio of the silane compound (II-1) to the silane compound (I) of 0.03 to 1.0 and a molar ratio of the silane compound (II-2) to the silane compound (I) of 0 to 1.0.

* * * * *

UNITED STATES PATENT AND TRADEMARK OFFICE
CERTIFICATE OF CORRECTION

PATENT NO. : 10,227,505 B2
APPLICATION NO. : 14/899826
DATED : March 12, 2019
INVENTOR(S) : Hiroki Fukaumi et al.

Page 1 of 1

It is certified that error appears in the above-identified patent and that said Letters Patent is hereby corrected as shown below:

In the Claims

At Column 28, Claim number 19, Line number 2, "$R^7$" should read -- $R^2$ --, and At Column 28, Claim number 19, Line number 9, "(11)" should read -- (II) --.

Signed and Sealed this
Thirtieth Day of July, 2019

Andrei Iancu
*Director of the United States Patent and Trademark Office*